Patented Apr. 15, 1952

2,592,746

UNITED STATES PATENT OFFICE 2,592,746

PROCESS OF MAKING ALKALI CELLULOSE

Hans Olof Samuelson, Gothenburg, Sweden, assignor to Mo och Domsjö Aktiebolag, Ornskoldsvik, Sweden, a corporation of Sweden No Drawing. Application November 8, 1949, Serial No. 126,235. In Sweden November 11, 1948

5 Claims. (Cl. 260—233)

In the production of rayon according to the viscose process, or of ethyl cellulose or methyl cellulose or of other cellulose ethers and esters it is desirable that the content in the final products of low molecular cellulose and impurities, e. g. pentosans, be as low as possible, this being important for the strength of the viscose rayon produced and for the use of for instance methyl cellulose in size paints or distempers. The present invention relates to a process of making alkali cellulose in which the alkali cellulose is freed from low molecular cellulose and various foreign matters in the course of its production. According to the invention the cellulosic material, e. g. wood pulp, is subjected to a mercerization and a subsequent pressing operation in two steps, the alkali cellulose being subjected to an ageing between the said steps. Hitherto the result aimed at by the present invention was sought achieved by subjecting the starting cellulosic material to a purification, generally comprising an alkali treatment of the cellulose either at a high temperature, e. g. 100° C., or at a lower temperature, e. g. 40° C. However, when treating cellulose at high temperature great losses of cellulosic material occur, and in low temperature treatment it is difficult to recover the sodium hydroxide used. During the ageing reactions take place through which part of the cellulosic material originally not soluble in alkali is converted into soluble form. Moreover, the pentosans present in the alkali cellulose largely become alkali soluble. According to the present invention pentosans and short-chained cellulose fractions will be removed by a repeated mercerization after the alkali cellulose has been subjected to ageing. The dissolution of pentosans from cellulosic material is illustrated by the following example.

A bleached sulfate pulp from pine was mercerized. The resulting alkali cellulose contained 2.43% of pentosans that could not be dissolved by means of mercerizing liquor. The mercerization was carried out at 20° C. during 1 hour. After ageing of the alkali cellulose during 10 hours a repeated treatment of the same with mercerizing liquor caused the greater part of the pentosans to be dissolved The pentosan content of the residue was 0.75%. An extension of the ageing period to 30 hours caused the corresponding figure to be lowered to 0.63%. Ageing was effected at 25° C. The original pulp had a viscosity of 44.8 cps. Tappi. After ageing for 10 hours the viscosity became 16.1 cps. After 30 hours ageing it was 7.7 cps.

The invention may be applied with advantage to raw materials which are rich in pentosans, such as sulfate pulps from various woods, and sulfite pulps from soft wood as well as from hard wood. It is particularly advantageous that the invention may be applied to high viscosity pulps, since in the production of such pulps the wood consumption is considerably reduced as compared with the production of pulps of normal viscosity. Moreover, the aged alkali cellulose and the final product, e. g., the viscose rayon, show improved polymolecularity.

According to a preferred embodiment of the invention the last mercerizing step is carried out with the aged alkali cellulose in the form of a suspension in sodium hydroxide solution. The excess of sodium hydroxide solution is removed in a continuously operating apparatus. From various points of view it is suitable to carry out the entire process, or part of the same, in a continuously operating apparatus. For the dissolution of low molecular cellulose or impurities, e. g. pentosans, the temperatures of the liquors used in the two mercerizing steps should preferably differ by at least 10° C. When treating certain cellulosic materials it has proved suitable to keep the temperature of the liquor used in the first step below 12° C. This promotes the desired dissolution and may be of considerable importance in connection with cellulosic materials containing large amounts of impurities, for instance for the quality of the produced viscose rayon. In the second mercerizing step a higher temperature, e. g. 20° C., may be used with advantage. Such higher temperature facilitates the removal e. g. pressing out of the liquor and may be of importance i. e. with a view to obtaining an alkali cellulose of uniform composition which may be used subsequently for different purposes, such as for the production of cellulose xanthate. For certain uses, e. g. for the production of viscose rayon of high strength, it has proved suitable to keep the hemicellulose content of the liquor used in the second step at a value not exceeding one third of that of the liquor used in the first step. To this end fresh mercerizing liquor may be added in the second step from which the used liquor is introduced into the first step, the liquor being purified according to known methods in such a manner that the hemicellulose content of the liquor in the second mercerizing step is kept on the requisite low level. In many cases it has proved suitable to use a low concentrated mercerizing liquor in the first step since the dissolution of undesirable components is thereby improved. In such cases the concentration of the mercerizing liquor should not exceed 180 grams of NaOH per litre. In the second mercerizing step, on the contrary, it may be desirable to use a mercerizing liquor of a concentration equal to at least 230 grams of NaOH per litre, for instance in the production of certain grades of viscose rayon. Another way of improving the dissolution of undesirable components also falling within the scope of this invention is to treat the cellulosic material in one and the same step with mercerizing liquors of different concentrations and/or temperatures which may promote the dissolution of alkali soluble components, such as wood polyoses and low molecular cellulose.

*Example 1*

In a mixer provided with a cellulose disintegrator sulfate pulp from pine having a viscosity of 30 cps. Tappi 206 and a pentosan content of 7.0% was continuously introduced. Simultaneously a sodium hydroxide solution containing 12% of NaOH, of a temperature of +3° C. and having a hemicellulose content of 40 grams per litre was added. The resulting suspension of alkali cellulose in sodium hydroxide solution was poured onto an endless wire sieve. The pulp layer formed on the sieve was warmed to 25° C. by being sprayed with mercerizing liquor of about 30° C. The pulp layer was then run through a press in which the excess liquor was removed leaving an alkali cellulose containing 30% of cellulose and 15% of NaOH.

The alkali cellulose thus obtained was aged continuously at 55° C. and was then suspended in a mercerizing liquor of a temperature of 35° C. and containing 260 grams per litre of NaOH and 8 grams per litre of hemicellulose.

The excess liquor was then removed in a continuously operating mercerizing press leaving an alkali cellulose containing 33% of cellulose and 15.5% of NaOH. This alkali cellulose had a viscosity of 5 cps. and contained 0.5% of pentosan.

*Example 2*

A bleached sulfate pulp from pine (Husum Bleached Kraft) with the following analytical data:

| | |
|---|---|
| Viscosity | cps__ 44.8 |
| Alpha cellulose | per cent__ 87.0 |
| Pentosan in alpha cellulose | do____ 2.43 |
| Pentosan (total) | do____ 9.40 | was subjected to slurry steeping with NaOH solution of a concentration of 18% during 60 minutes at 20° C. The mercerizing liquor contained 230 grams of NaOH and 0.4 gram of high sulfonated castor oil per litre. The alkali cellulose was pressed (press ratio 2.62) and was then shredded in a Werner-Pfleiderer shredder during 2 hours at 19–22° C. After shredding the cellulose had the following analysis:

| | Per cent |
|---|---|
| Cellulose | 29.6 |
| NaOH | 15.8 |
| Na₂CO₃ | 0.5 |

The alkali cellulose was aged at 25° C. After ageing periods of varying duration samples were taken out and subjected to analysis after having been washed and treated with dilute acetic acid. The results are stated in the following table:

| Ageing period (hours) | Viscosity in cps. | Alpha cellulose in per cent | Pentosan in the alpha cellulose in per cent |
|---|---|---|---|
| 10 | 16.1 | 96.6 | 0.75 |
| 20 | 11.0 | 96.5 | 0.67 |
| 30 | 7.7 | 96.6 | 0.63 |
| 40 | 6.7 | 96.4 | 0.60 |

*Example 3*

A sulfite pulp from birch (Hörnefors Bleached Hardwood H 4024/49) with the analytical data:

| | |
|---|---|
| Viscosity | 16.5 cps. (Tappi T 206) |
| Alpha cellulose | 91.1% (CCA 7) |
| Pentosan | 3.17% (CCA 4 colorimetrically by means of orcinol) | was mercerized in the form of sheets by means of NaOH solution of a concentration of 19% at 20° C. during 60 minutes. The alkali cellulose was pressed (press ratio 2.86) and was thereupon shredded in a Werner-Pfleiderer shredder during 2 hours at 20–24° C. The analysis of the alkali cellulose after shredding was:

| | Per cent |
|---|---|
| Cellulose | 30.0 |
| NaOH | 15.6 |
| Na₂CO₃ | 0.6 |

The alkali cellulose was aged at 25° C. The viscosity of the regenerated cellulose after ageing periods of varying duration is stated below (the length of the ageing periods being counted from the beginning of the mercerization):

| Ageing period (hours) | Viscosity in cps. |
|---|---|
| 10 | 10.5 |
| 20 | 7.6 |
| 26 | 7.0 |

The pulp which had been aged to 7.0 cps. was regenerated by washing the same with water and by treating it with dilute acetic acid. The pentosan content of the regenerated cellulose was 0.69%. The pulp was again mercerized by means of NaOH solution of a concentration of 17.5% during 30 minutes at 20° C. The alpha cellulose content was determined according to CCA 7. Results:

| | |
|---|---|
| Yield of alpha cellulose after 2nd mercerization | per cent__ 92.0 |
| Viscosity | cps__ 6.5 |
| Pentosan | per cent__ 0.45 |

*Example 4*

A paper pulp (White Horse H 399/48) made from spruce according to the sulfite process and with the analytical data:

| | |
|---|---|
| Viscosity | cps__ 75 |
| Alpha cellulose | percent__ 88.1 |
| Pentosan content of the alpha cellulose | do____ 0.96 |
| Total pentosan content | do____ 4.07 | was subjected to slurry steeping by means of NaOH solution of a concentration of 19% at 20° C. during 60 minutes. The alkali cellulose was then centrifuged during 20 minutes in a centrifuge having a perforated basket lined with a metal wire cloth and rotating at a speed of about 1300 revolutions per minute in order to remove excess liquor. The press ratio after centrifugation was 3.57 and the analysis of the alkali cellulose after shredding during 2 hours in a Werner-Pfleiderer shredder was:

| | Percent |
|---|---|
| Cellulose | 22.6 |
| NaOH | 20.6 |
| Na₂CO₃ | 0.5 |

The alkali cellulose was aged at 35° C. The regenerated cellulose had the following viscosity after ageing periods of varying duration:

| Ageing period (hours) | Viscosity in cps. |
|---|---|
| 10 | 12.2 |
| 20 | 6.0 |
| 26 | 4.5 |

The length of the ageing periods was counted from the beginning of the mercerization.

The pulp which had been aged to 6.0 cps. was regenerated by being washed with water and treated with dilute acetic acid. After regeneration the pentosan content was 0.48%. The pulp was again mercerized by means of NaOH solution of a concentration of 17.5% during 30 minutes at 20° C. The alpha cellulose content was determined according to CCA 7. Results:

Yield of alpha cellulose after 2nd
  mercerization _____percent__ 97.0
Viscosity _____cps__ 5.8
Pentosan _____percent__ 0.36

Example 5

The pressed and shredded alkali cellulose obtained from sulfate pulp according to Example 2 and having been aged for 40 hours at 25° C. was treated with mercerizing liquor containing 17.5% of NaOH during 30 minutes at 20° C. After removing excess liquor together with the products dissolved therein an alkali cellulose was obtained which when regenerated yields a cellulose containing 99.1% of alpha cellulose and 0.6% of pentosan. This alkali cellulose forms an excellent starting material for the production of viscose and for other purposes, its analytical data being unparalleled in the art.

Similarly, the alkali cellulose obtained from sulfite pulp by mercerization, ageing during 20 hours to 6.0 cps., and repeated treatment with mercerizing liquor according to Example 4 when regenerated yields a cellulose containing 99.3% of alpha cellulose and 0.36% of pentosan. This is also a result hitherto not achieved in the art.

In all of the above examples determination of the pentosan content was carried out colorimetrically according to the orcinol method.

What I claim is:

1. In a process of making alkali cellulose the steps of treating cellulosic material with mercerizing liquor to form alkali cellulose, removing excess mercerizing liquor from said alkali cellulose, subjecting said alkali cellulose to ageing in order to decrease its polymolecularity with attendant formation of alkali soluble products therein, treating the aged alkali cellulose with mercerizing liquor to dissolve said alkali soluble products, and removing excess mercerizing liquor containing said alkali soluble products from said alkali cellulose, the temperatures of the mercerizing liquors used in the two mercerizing steps differing by at least 10° C.

2. In a process of making alkali cellulose the steps of treating cellulosic material with mercerizing liquor to form alkali cellulose, removing excess mercerizing liquor from said alkali cellulose, subjecting said alkali cellulose to ageing in order to decrease its polymolecularity with attendant formation of alkali soluble products therein, treating the aged alkali cellulose with mercerizing liquor to dissolve said alkali soluble products, and removing excess mercerizing liquor containing said alkali soluble products from said alkali cellulose, the temperature of the mercerizing liquor used in the first mercerizing step being less than 12° C.

3. In a process of making alkali cellulose the steps of treating cellulosic material with mercerizing liquor to form alkali cellulose, removing excess mercerizing liquor from said alkali cellulose, subjecting said alkali cellulose to ageing in order to decrease its polymolecularity with attendant formation of alkali soluble products therein, treating the aged alkali cellulose with mercerizing liquor to dissolve said alkali soluble products, and removing excess mercerizing liquor containing said alkali soluble products from said alkali cellulose, the temperature of the mercerizing liquor used in the second mercerizing step being at least 20° C.

4. In a process of making alkali cellulose the steps of treating cellulosic material with mercerizing liquor to form alkali cellulose, removing excess mercerizing liquor from said alkali cellulose, subjecting said alkali cellulose to ageing in order to decrease its polymolecularity with attendant formation of alkali soluble products therein, treating the aged alkali cellulose with mercerizing liquor to dissolve said alkali soluble products, and removing excess mercerizing liquor containing said alkali soluble products from said alkali cellulose, the mercerizing liquor used in the first mercerizing step having a concentration not exceeding 180 grams of NaOH per litre.

5. In a process of making alkali cellulose the steps of treating cellulosic material with mercerizing liquor to form alkali cellulose, removing excess mercerizing liquor from said alkali cellulose, subjecting said alkali cellulose to ageing in order to decrease its polymolecularity with attendant formation of alkali soluble products therein, treating the aged alkali cellulose with mercerizing liquor to dissolve said alkali soluble products, and removing excess mercerizing liquor containing said alkali soluble products from said alkali cellulose, the mercerizing liquor used in the second mercerizing step having a concentration of at least 230 grams of NaOH per litre.

HANS OLOF SAMUELSON.

REFERENCES CITED

The following references are of record in the file of this patent:

UNITED STATES PATENTS

| Number | Name | Date |
|---|---|---|
| 1,821,321 | Richter | Sept. 1, 1931 |
| 1,848,662 | Richter | Mar. 8, 1932 |
| 2,036,606 | Richter | Apr. 7, 1936 |
| 2,274,463 | Stoeckly | Feb. 24, 1942 |

FOREIGN PATENTS

| Number | Country | Date |
|---|---|---|
| 229,678 | Great Britain | May 18, 1926 |
| 427,626 | Great Britain | Apr. 23, 1935 |